United States Patent
Yoon

(10) Patent No.: US 7,593,082 B2
(45) Date of Patent: Sep. 22, 2009

(54) RUBBING MEMBRANE MATERIAL AND LIQUID CRYSTAL DISPLAY DEVICE USING THE SAME

(75) Inventor: Dong-Kyu Yoon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 307 days.

(21) Appl. No.: 11/645,618

(22) Filed: Dec. 27, 2006

(65) Prior Publication Data

US 2007/0154659 A1    Jul. 5, 2007

(30) Foreign Application Priority Data

Dec. 29, 2005  (KR) .................. 10-2005-0134616

(51) Int. Cl.
*G02F 1/1337*  (2006.01)

(52) U.S. Cl. ........................................ 349/136

(58) Field of Classification Search ............... 349/123, 349/136

See application file for complete search history.

*Primary Examiner*—Jerry T Rahll
(74) *Attorney, Agent, or Firm*—Morgan Lewis & Bockius LLP

(57) ABSTRACT

An alignment material for a liquid crystal display (LCD) device includes a mixture of carbon nano-tube and polyimide.

16 Claims, 4 Drawing Sheets

RUBBING MEMBRANE MATERIAL AND LIQUID CRYSTAL DISPLAY DEVICE USING THE SAME

This application claims the benefit of the Korean Patent Application No. 2005-134616 filed on Dec. 29, 2005, which is hereby incorporated by reference.

BACKGROUND OF THE INVENTION

1. Field of the Invention

The present invention relates to an alignment material for a liquid crystal display (LCD) device, and more particularly, to an LCD device with a simplified manufacturing process using the same.

2. Discussion of the Related Art

Liquid crystal display (hereinafter, referred to as "LCD") devices are becoming more important as a visual information transmitting medium. In order to compete, other various types of display devices are being developed. Therefore, superior operating conditions, such as low power consumption, thin size, light weight, high quality, and the like, are required to occupy a leading position among the various types of display devices.

Currently, LCD devices are used as a main component of flat panel display (FPD) devices because LCD devices satisfy both performance and mass productivity conditions described above. Accordingly, the LCD device is widely utilized in various types of applications, such as in televisions (TVs), navigation systems, and the like. Moreover, the LCD device is regarded as a key display device capable of replacing the existing cathode ray tube (CRT) dominated market.

Generally, LCD devices include a lower substrate referred to as a thin film transistor (TFT) array substrate, an upper substrate referred to as a color filter substrate, and a liquid crystal layer formed of a liquid crystal material filled in a space between the upper substrate and the lower substrate. In this instance, N×M pixels are arranged on the lower substrate in horizontal and vertical directions. Each unit pixel includes a thin film transistor for transmitting an image signal and a pixel electrode for forming an electric field. The upper substrate includes a color filter pattern, a black matrix, and the like. A vertical electric field is generated between a common electrode and a corresponding pixel electrode. The liquid crystal layer, which is filled in the space between the upper substrate and the lower substrate, is made of a material having an optically anisotropic property. In this instance, the liquid crystal is arranged differently depending upon the electric field to be generated between the pixel electrode and the common electrode, thereby generating a transmittance change according to a polarization property of light.

An alignment film is formed on the surfaces of the upper substrate and the lower substrate, respectively, that is to come in contact with the liquid crystal layer. The alignment film functions to control the direction of the electric field that is generated between the pixel electrode and the common electrode in a state where liquid crystal molecules have uniform alignment.

In general, polyimide corresponding to a polymeric material is generally utilized for the alignment film, and the alignment film is aligned in a certain direction to align the liquid crystal in a predetermined direction. In this case, various types of alignment methods may be utilized. An alignment method by rubbing is currently most widely used.

The alignment method by rubbing includes the steps of initially forming an alignment film on a substrate and rubbing the alignment film by using a rubbing membrane, thereby forming uniform microgrooves on the alignment film. Specifically, in the above-described method, liquid crystal molecules interact with the alignment film formed with the microgrooves formed by rubbing to control the alignment of the liquid crystal molecules. Therefore, the liquid crystal molecules may be uniformly aligned into a desired direction over the whole surface of the alignment film.

Hereinafter, a section structure of a TFT array substrate and a color filter substrate according to a related art will be described with reference to FIGS. 1 and 2. As shown in FIG. 1, the related art TFT array substrate 117 includes a gate electrode 103 formed of a metal layer on a substrate 101. A gate insulating layer 105 consisting of $SiO_2$ or $SiN_x$ is provided on the substrate 101 including the gate electrode 103. An active layer pattern 107 patterned into a shape of an island is formed on the gate insulating layer 105. Source and drain electrodes 109a and 109b are formed on the active layer pattern 107 to overlap the active layer pattern 107 in a predetermined shape. In this instance, an inter-layer insulating layer 111 is formed on the substrate 101 including the source and the drain electrodes 109a and 109b. A pixel electrode 113 is formed on the inter-layer insulating layer 111 to be electrically connected with the drain electrode 109b via a contact hole (not shown) formed in the inter-layer insulating layer 111. Finally, an alignment film 115 is formed on the whole surface of the substrate including the pixel electrode 113.

As shown in FIG. 2, the color filter substrate 213 includes black matrices 203 made of a metal material or a black resin on a substrate 201. In this instance, the black matrixes 203 are formed around a pixel area. Color filter patterns 205a, 205b, and 205c, which are red, green, and blue, respectively, are formed between the black matrixes 203. An overcoat layer 207 is formed on the color filter patterns 205a, 205b, and 205c, and a common electrode 209 is formed on the overcoat layer 207. An alignment film 211 is formed on the whole surface of the substrate including the common electrode 209.

As shown in FIG. 3, a liquid crystal panel 300 is formed by bonding the TFT array substrate 117 and the color filter substrate 213 to each other and filling a space between the TFT array substrate 117 and the color filter substrate 213 with a liquid crystal layer 301. The liquid crystal layer 301 contacts with the alignment films 115 and 211. Because the liquid crystal layer 301 is formed between the TFT array substrate 117 and the color filter substrate 213, a light dielectric ratio changes due to an electric field.

As described above, the related art LCD device requires separate alignment films on the pixel electrode and the common electrode respectively. This is because the material used to form the pixel electrode and the common electrode consists of a metal oxide film, such as indium tin oxide (ITO) or indium zinc oxide (IZO). The metal oxide films cannot be used as alignment films. Therefore, in the LCD device of the related art, additional alignment films are required on the pixel electrode and the common electrode, thereby increasing the number of process steps and reducing productivity.

SUMMARY OF THE INVENTION

Accordingly, the present invention is directed to an alignment material for a liquid crystal display (LCD) device and an LCD device using the same that substantially obviates one or more problems due to limitations and disadvantages of the related art.

An object of the present invention is to provide an alignment material for an LCD device and an LCD device using the same that has increased productivity and reduced fabrication steps.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the alignment material for a liquid crystal display (LCD) device includes a mixture of carbon nano-tube and polyimide.

In another aspect, the liquid crystal display (LCD) device includes first and second substrates bonded to each other, a liquid crystal layer formed between the first substrate and the second substrate, a pixel electrode formed on the first substrate to pre-align the liquid crystal layer in a particular direction, and a common electrode formed on the second substrate to pre-align the liquid crystal layer in a particular direction.

In yet another aspect, the liquid crystal display (LCD) device includes at least one substrate, and an alignment layer formed on the substrate to align a liquid crystal in a first direction and to align the liquid crystal in a second direction when current or voltage is applied thereto.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In general, an organic film, such as polyimide, is typically used as an alignment film. In order to make the alignment film, such as polyimide, function also as a pixel electrode and a common electrode in accordance with the present invention, conductivity of the alignment film must be secured. Therefore, the pixel electrode and the common electrode according to the present invention are made of a material consisting of carbon nano-tubes and polyimide.

Figure 1:
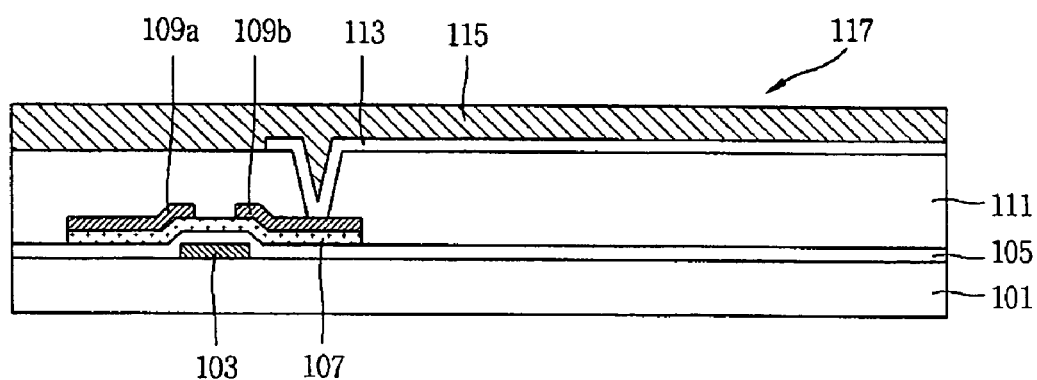
FIG. 1 is a cross-sectional view illustrating a thin film transistor array substrate according to a related art.
Figure 2:
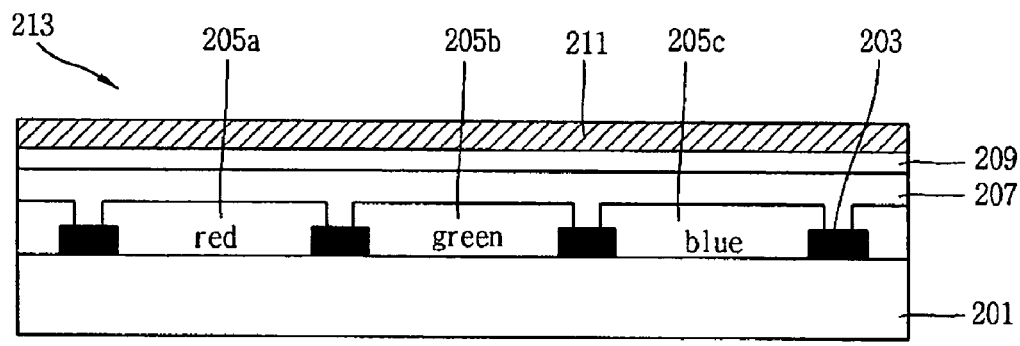
FIG. 2 is a cross-sectional view illustrating a color filter substrate according to the related art.
Figure 3:
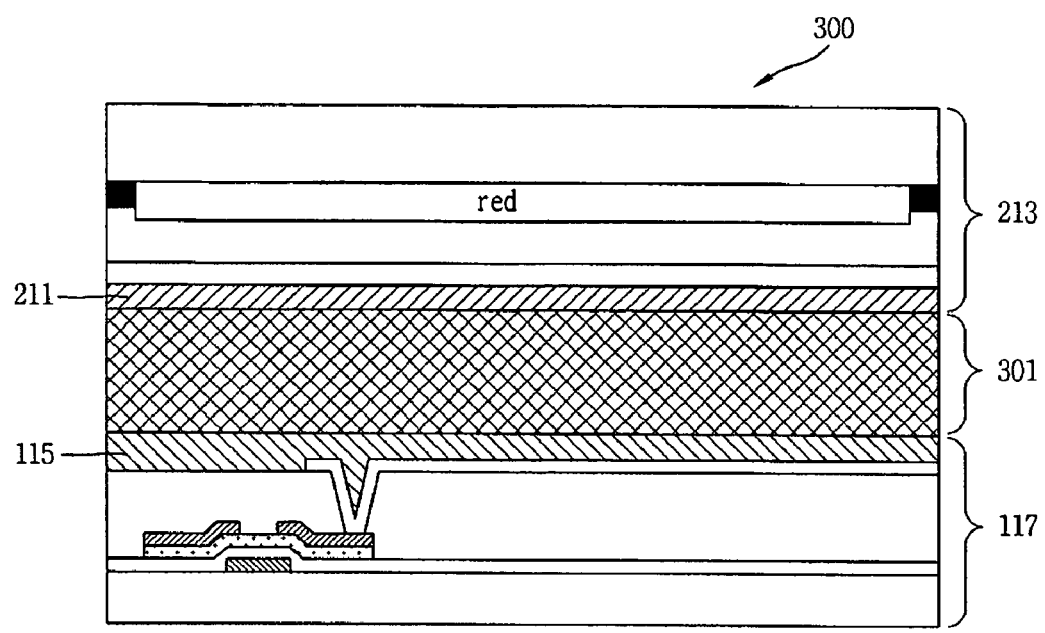
FIG. 3 is a cross-sectional view illustrating a liquid crystal panel according to the related art.
Figure 4:
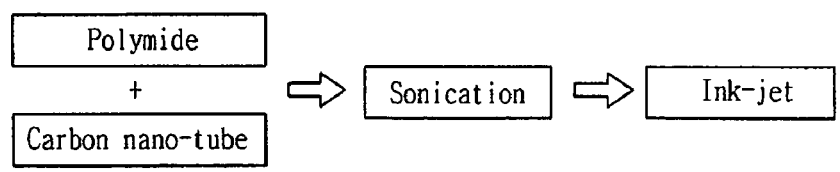
FIG. 4 is a flowchart illustrating an exemplary process of forming an LCD device according to the present invention.

FIG. 4 illustrates an exemplary method of composing an alignment material and an exemplary process of forming an electrode on a liquid crystal panel according to the present invention. As shown in FIG. 4, polyimide and carbon nano-tubes must be mixed with each other to compose the alignment material.

In this instance, polyimide corresponds to a polymeric material in a solid state at room temperature. Therefore, in order to evenly distribute the carbon nano-tubes with respect to the polyimide, a process of mixing carbon nano-tubes in with a solution containing a monomer constituting polyimide and a solvent and performing polymerization is required. Specifically, carbon nano-tubes are not mixed with synthesis-finished polyimide. Rather, the carbon nano-tubes are mixed in before the polymerization occurs.

The carbon nano-tubes must be uniformly distributed with respect to the polyimide so that the polyimide mixed with the carbon nano-tubes may have conductivity. For this, the polymerization is performed while the polymer is exposed to ultrasonic waves.

An ink-jet method is used to form an electrode in a predetermined shape on a substrate using the alignment material acquired through the above-described process. Since a pattern forming material must be in a liquid state to form an electrode by using the ink-jet method, an ink-jet process is performed when polyimide mixed with carbon nano-tubes are dissolved in a solvent. The solvent vaporizes during a curing process after the patterning process.

A mixing ratio between the carbon nano-tubes and the polyimide is critical in creating a material that simultaneously has conductivity and an alignment property. When a proportion of carbon nano-tubes is too high, light transmittance cannot be secured. Conversely, when the proportion thereof is too small, conductivity cannot be acquired. Therefore, the most desirable mixing ratio to secure light transmittance and conductivity at the same time is obtained when carbon nano-tubes are mixed with polyimide at a volume ratio of about 0.1 to about 1.0%.

In accordance with the present invention, the mixed proportion of carbon nano-tube is relatively small. Therefore, the decrease of light transmittance is insignificant compared to polyimide without carbon nano-tubes mixed in. Therefore, the light transmittance of the material is satisfactory for use as a pixel electrode and a common electrode.

Furthermore, when the carbon nano-tubes are uniformly mixed in with high polymers, conductivity is significantly enhanced by as much as about 10 times when compared with the same with about 0 to about 0.1% of the mixed proportion of carbon nano-tubes. When the mixed proportion is greater than this, the conductivity is reduced.

Therefore, when a volume ratio of carbon nano-tubes to be mixed with polyimide is about 0.1 to about 1.0%, light transmittance and conductivity may be secured simultaneously. Hence, a mixture thereof may be appropriate for use as a pixel electrode and a common electrode.

The material including carbon nano-tubes and polyimide, as described above, has an alignment property of aligning liquid crystals in a particular direction in the same manner as that of the related art. In this instance, since an amount of carbon nano-tubes to be mixed with polyimide is very small, the aligning property remains intact even after they are mixed together.

As described above, the alignment material according to the present invention may be used as both an alignment layer and as an electrode due to the light transmittance and the conductivity characteristics as well as the ability to align the liquid crystal in a particular direction. Therefore, it is possible to form the alignment film and the electrode of the LCD device using a single material.

Hereinafter, a structure of an exemplary liquid crystal display (LCD) device adopting an alignment material according to the present invention will be described. An exemplary structure of a thin film transistor (TFT) array substrate according to the present invention will be described with reference to FIG. 5.

Figure 5:
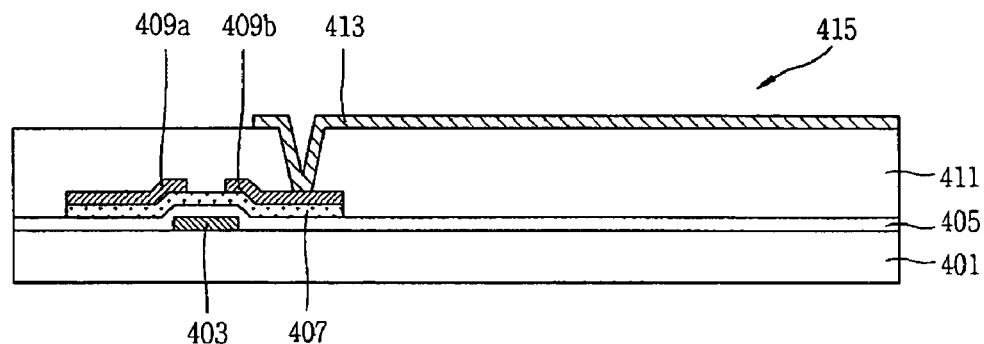
FIG. 5 is a cross-sectional view illustrating an exemplary thin film transistor array substrate according to the present invention.

As shown in FIG. 5, the TFT array substrate 415 of the LCD device according to the present invention includes a thin film transistor for each pixel. The thin film transistor includes a substrate 401, a gate electrode 403, a gate insulating layer 405, an active layer pattern 407, and source/drain electrodes 409a and 409b. An inter-layer insulating layer 411 is formed on the source/drain electrodes 409a and 409b, and a pixel electrode 413 is formed on the inter-layer insulating layer 411.

In accordance with the present invention, the pixel electrode 413 is made of a material having a mixture of carbon nano-tubes and polyimide. Specifically, the pixel electrode 413 also acts as an alignment film formed by using a single material. Accordingly, an additional alignment film is not needed. As discussed above, the carbon nano-tube is mixed with polyimide at a volume ratio of about 0.1 to about 1.0% to obtain the material used to form the pixel electrode 413.

Figure 6:
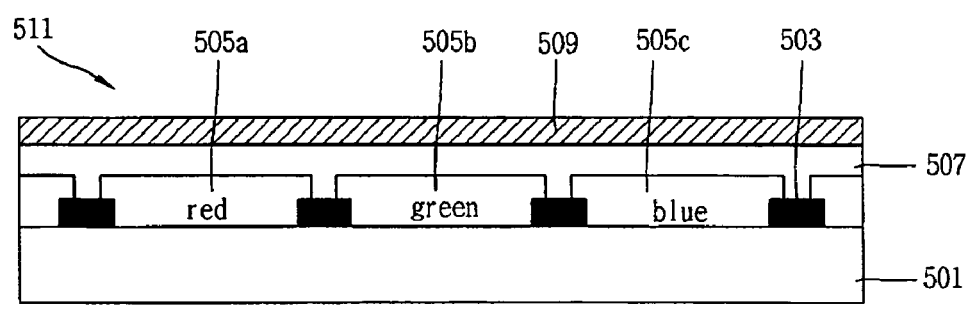
FIG. 6 is a cross-sectional view illustrating an exemplary color filter substrate according to the present invention.

Hereinafter, an exemplary structure of a color filter substrate according to the present invention will be described with reference to FIG. 6. As shown in FIG. 6, the color filter substrate 511 includes a substrate 501, black matrices 503, color filter patterns 505a, 505b, and 505c, an overcoat layer 507, and a common electrode 509.

Like the pixel electrode 413 on the TFT array substrate of the present invention, the common electrode 509 is made of a single material containing a mixture of carbon nano-tubes and polyimide mixed at the volume ratio of about 0.1 to about 1.0%. Accordingly, an additional alignment film is not needed.

Figure 7:
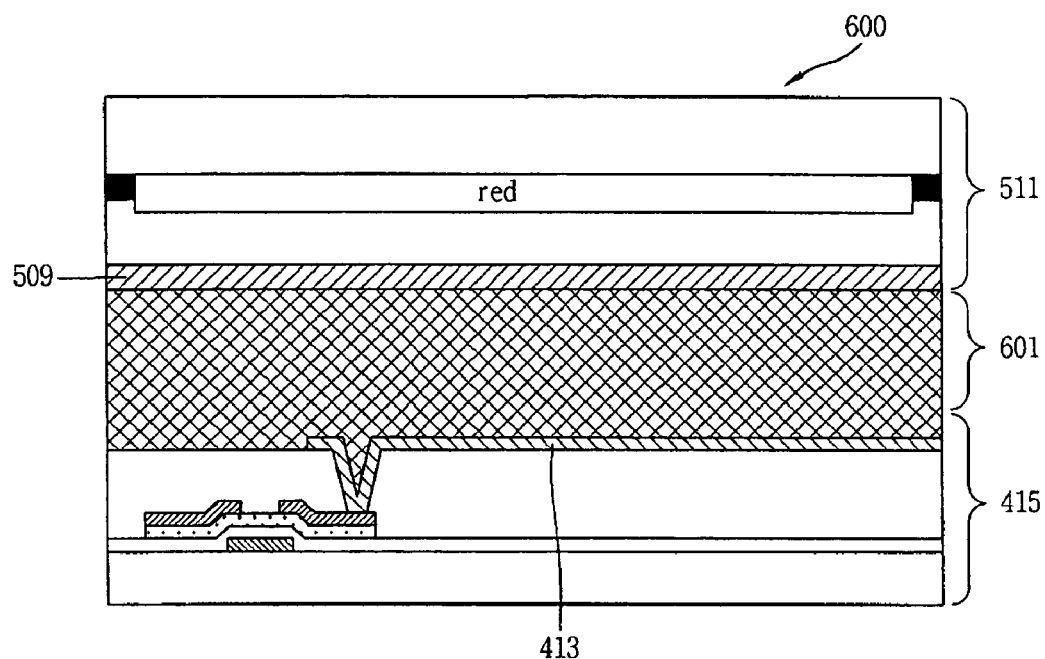
FIG. 7 is a cross-sectional view illustrating an exemplary liquid crystal panel according to the present invention.

Hereinafter, an exemplary structure of a liquid crystal panel composed of a TFT array substrate and a color filter substrate according to the present invention will be described with reference to FIG. 7. As shown in FIG. 7, the liquid crystal panel 600 includes the TFT array substrate 415, the color filter substrate 511, and a liquid crystal layer 601 filled in a space between the TFT array substrate 415 and the color filter substrate 511. In this instance, the TFT array substrate 415 includes a pixel electrode 413 made of a mixture of carbon nano-tubes and polyimide, and the color filter substrate 511 includes a common electrode 509 made of a mixture of carbon nano-tubes and polyimide.

The structure of the liquid crystal panel illustrated in FIG. 7 is only an exemplary embodiment according to the present invention and therefore is not meant to be limited thereto. Specifically, the liquid crystal panel according to the present invention may be constructed in such a manner that the TFT array substrate in accordance with the present invention is bonded to the related art color filter substrate. In the alternative, the liquid crystal panel according to the present invention also may be constructed in such a manner that the related art TFT array substrate is bonded to the color filter substrate in accordance with the present invention.

Moreover, the liquid crystal panel of the present invention may be used as a single LCD device by combining a backlight unit and a drive unit thereto.

As described above, the alignment material according to the mixing ratio of the present invention has both transparent and conductive properties. Hence, the alignment material according to the present invention is suitable for the pixel electrode and the common electrode. Also, since the alignment material according to the present invention has a liquid crystal aligning property of polyimide, the same may be used to align liquid crystals in a particular direction via an alignment process. Therefore, the LCD device according to the present invention includes a pixel electrode and a common electrode made from a material that allows the electrodes to function also as an alignment film. Therefore, productivity may be enhanced during manufacture of the LCD device.

It will be apparent to those skilled in the art that various modifications and variations can be made in the alignment material of the present invention and the LCD device using the same without departing from the spirit or scope of the invention. Thus, it is intended that the present invention cover the modifications and variations of this invention provided they come within the scope of the appended claims and their equivalents.

What is claimed is:

1. An alignment material for a liquid crystal display (LCD) device, comprising a mixture of carbon nano-tube and polyimide.

2. The alignment material as claimed in claim 1, wherein the mixture has transparency and conductivity properties.

3. The alignment material as claimed in claim 1, wherein the mixture includes carbon nano-tubes and polyimide at a volume ratio of about 0.1 to about 1.0%.

4. A liquid crystal display (LCD) device, comprising:
first and second substrates bonded to each other;
a liquid crystal layer formed between the first substrate and the second substrate;
a pixel electrode formed on the first substrate to pre-align the liquid crystal layer in a particular direction, the pixel electrode being made of a mixture of carbon nano-tube and polyimide; and
a common electrode formed on the second substrate to pre-align the liquid crystal layer in a particular direction.

5. The LCD device as claimed in claim 4, wherein each of the pixel electrode and the common electrode is made of a mixture that includes carbon nano-tubes and polyimide at a volume ratio of about 0.1% to about 1.0%.

6. The LCD device as claimed in claim 4, wherein the mixture has transparency and conductivity properties.

7. The LCD device as claimed in claim 4, wherein the mixture includes carbon nano-tubes and polyimide at a volume ratio of about 0.1% to about 1.0%.

8. The LCD device as claimed in claim 4, wherein the common electrode is made of a mixture of carbon nano-tube and polyimide.

9. The LCD device as claimed in claim 8, wherein the mixture has transparency and conductivity properties.

10. The LCD device as claimed in claim 8, wherein the mixture includes carbon nano-tubes and polyimide at a volume ratio of about 0.1% to about 1.0%.

11. A liquid crystal display (LCD) device, comprising:
first and second substrates bonded to each other;
a liquid crystal layer formed between the first substrate and the second substrate;
a pixel electrode formed on the first substrate to pre-align the liquid crystal layer in a particular direction and
a common electrode formed on the second substrate to pre-align the liquid crystal layer in a particular direction, the common electrode being made of a mixture of carbon nano-tube and polyimide.

12. The LCD device as claimed in claim 11, wherein the mixture has transparency and conductivity properties.

13. The LCD device as claimed in claim 11, wherein the mixture includes carbon nano-tubes and polyimide at a volume ratio of about 0.1% to about 1.0%.

14. A liquid crystal display (LCD) device, comprising:
   at least one substrate; and
   an alignment layer formed on the substrate to align a liquid crystal in a first direction and to align the liquid crystal in a second direction when current or voltage is applied thereto, the alignment layer being made of a mixture of carbon nano-tube and polyimide.

15. The LCD device as claimed in claim 14, wherein the mixture includes carbon nano-tubes and polyimide at a volume ratio of about 0.1% to about 1.0%.

16. The LCD device as claimed in claim 14, wherein the mixture has transparency and conductivity properties.

* * * * *